United States Patent [19]

Olsen et al.

[11] Patent Number: 5,573,948
[45] Date of Patent: Nov. 12, 1996

[54] METHOD AND PLANT FOR PROCESSING OF POTATOES AND USE OF A POTATO PROCESSING PLANT

[75] Inventors: Hans S. Olsen; Erik C. Wormslev, both of Holte, Denmark

[73] Assignee: Novo Nordisk A/S, Bagsvaerd, Denmark

[21] Appl. No.: 256,327

[22] PCT Filed: Jan. 28, 1993

[86] PCT No.: PCT/DK93/00029

§ 371 Date: Jul. 7, 1994

§ 102(e) Date: Jul. 7, 1994

[87] PCT Pub. No.: WO93/16109

PCT Pub. Date: Aug. 19, 1993

[30] Foreign Application Priority Data

Feb. 6, 1992 [DK] Denmark ................................. 0140/92

[51] Int. Cl.$^6$ ................................. C12S 3/18; C12S 3/14; C12S 3/12

[52] U.S. Cl. ........................ 435/271; 435/272; 435/275; 426/635; 426/637; 426/417

[58] Field of Search ................................. 435/41, 93, 101, 435/134, 288, 289, 316, 813, 819, 262, 267, 271, 272, 274, 275, 276, 289.1, 294.1; 426/635, 637, 417; 99/448

[56] References Cited

U.S. PATENT DOCUMENTS

| 3,891,770 | 6/1975 | Sato et al. | 426/36 |
| 4,167,584 | 9/1979 | Nelson | 426/2 |
| 5,013,561 | 5/1991 | Goering et al. | 426/28 |

*Primary Examiner*—William Beisner
*Attorney, Agent, or Firm*—Steve T. Zelson, Esq.; Cheryl H. Agris, Esq.

[57] ABSTRACT

The method for processing of potatoes is characterized by the fact that the method is carried out in a potato processing plant, which comprises an oil separator, heating equipment and at least one enzyme reactor and which is modified in such a manner that it can also be used for processing of rape. It is not obvious that such modification is sufficiently small for achieving an economically sound method for processing of rape outside the potato season.

8 Claims, 5 Drawing Sheets

METHOD AND PLANT FOR PROCESSING OF POTATOES AND USE OF A POTATO PROCESSING PLANT

FIELD OF THE INVENTION

The invention comprises a method for processing of potatoes, a potato processing plant, and a use of the potato processing plant.

BACKGROUND OF THE INVENTION

The processing of potatoes is an old art. Potato starch and potato fodder protein are the main products obtainable from the crude potato starting material. Potatoes have to be processed shortly after harvesting; otherwise both the starch and the protein are degraded. This means that a potato processing plant is only working around 4 months a year. The remaining part of the year the potato processing plant is shut down.

Obviously, it is a desideratum to put the potato processing plant to a useful purpose during the remaining part of the year, as this would result in a vast economic advantage. However, so far no one has been able to solve this problem.

Thus, it is the purpose of the invention to provide an economically sound method for processing of potatoes, which is carried out in a plant, which can be used for another useful purpose outside the potato season.

Now, surprisingly, according to the invention it has been found that the purpose of the invention can be fulfilled if the potato processing is carried out enzymatically and if the potato processing plant is modified slightly; in this manner the plant can be used for processing of rape outside the potato season, an enzymatic rape process being used. In relation to the invention a special enzymatic rape processing is used, which is well suited for combination with the potato processing.

Also, flax, sunflower, soy beans and other oil containing seeds related to rape, or olive fruit can be substituted for rape in the method, plant and use according to the invention. However, for the sake of brevity, these oil containing crops will be referred to as rape in the following.

SUMMARY OF THE INVENTION

Thus, the method according to the invention for processing of potatoes is characterized by the fact that the method is carried out in a potato processing plant, which comprises an oil separator, heating equipment and at least one enzyme reactor, and which is modified in such a manner that it can also be used for processing of rape. It is not obvious that the above indicated modifications are relatively small and of such a nature that the potato processing plant in an economically sound manner can be used for e.g. rape processing outside the potato season. The skilled worker in the art will understand that the ratio between the duration of the "potato period" and the duration of the "rape period" should be adapted in such a manner that the single pieces of equipment in the plant are utilized optimally. Usually the "potato period" will amount to between 3 and 6 months, and correspondingly the "rape period" will amount to between 9 and 6 months.

A typical potato processing plant functions in the following manner. The potatoes are washed by means of water, and stones and dirt are removed. Subsequently the potatoes are disintegrated by milling. Water may be added to facilitate the separation of juice (fruit water). The separation of juice is performed by decanters. The macerated potatoes are then extracted in centrifugal sieves. The starch leaves the stainer basket as a filtrate. From this filtrate the starch is recovered by means of nozzle bowl separators or cyclones, and then the starch is dewatered and dried. The pulp discharges as filter overflow from the centrifugal sieves. The extracted pulp is treated according to WO 93/15615, i.e. the pulp is cooked, preferably at 140° C. at a holding time of 20 seconds, and the cooked slurry is hereafter cooled to 50° C. and transferred to a stirring tank and treated with a cell wall degrading enzyme. The fruit water is treated according to WO 93/15616. Specifically, the fruit water is subjected to a heat treatment to at least 125° C. for at least 3 minutes, whereafter the heat treated potato fruit water is cooled to a temperature, at which enzymes are relatively stable, then enzymatically treated with a proteinase, and finally concentrated to a microbial stability. Thus, the end products are starch and protein fodder.

A preferred embodiment of the method according to the invention is characterized by the fact that the enzymatic processing plant comprises a washer (p), a disintegrator (m), a decanter (m), a centrifugal sieve (m), a cooker (m), an enzyme reactor (m), a decanter (p), a jet cooker (p), an enzyme reactor (p), an evaporator (m), a spray dryer (m), a nozzle centrifuge (m), a vacuum filter (p), a ring dryer (m), and an oil separator (r), whereby an m in brackets behind an apparatus means an apparatus mutual for potato and rape processing, a p in brackets behind an apparatus means an apparatus exclusively for potato processing, and an r in brackets behind an apparatus means an apparatus exclusively for rape processing. This embodiment of the method according to the invention secures a possibility for an efficient processing of potatoes, and also an efficient processing of rape outside the potato season. In certain cases it is possible instead of the two decanters (decanter (m) and decanter (p)) and the two enzyme reactors (enzyme reactor (m) and enzyme reactor (p)) to use just one decanter and one enzyme reactor, by means of special flow systems; such methods are deemed to be encompassed by the invention, too. Also, the method, the plant, and the use according to the invention comprises as a preferred embodiment the use of a dry milling unit and a wet milling unit directly upstream the disintegrator, whereby these two milling units are used as a supplement to the disintegrator, when rape is processed.

Also, the invention comprises a potato processing plant suitable for performance of the method according to the invention, which is characterized by the fact that the plant comprises an oil separator, heating equipment, and at least one enzyme reactor, and modified in such manner that it can also be used for processing of rape.

DESCRIPTION OF PREFERRED EMBODIMENTS

Figure 1:
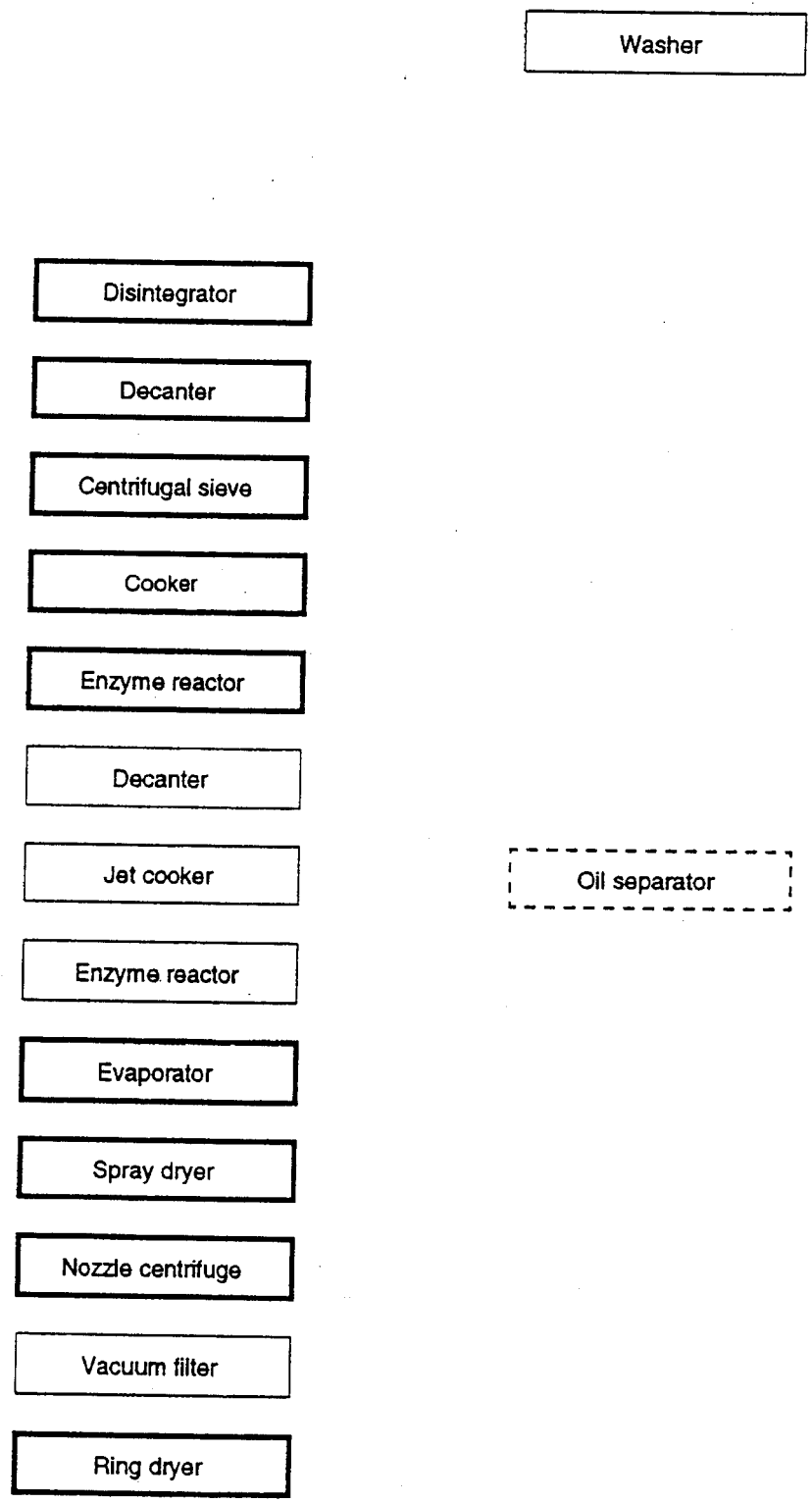
FIG. 1 shows an embodiment of the combined potato and rape procesing plant. The apparatuses which are used for both process, are shown with full fat lines, the apparatuses which are used for potato processing only, are shown with full thin lines, and the apparatus, which is used for the rape processing only, is shown with dotted thin lines.

A preferred embodiment of the potato processing plant according to the invention is characterized by the fact that the plant comprises a washer (p), a disintegrator (m), a decanter (m), a centrifugal sieve (m), a cooker (m), an enzyme reactor (m), a decanter (p), a jet cooker (p), an enzyme reactor (p), an evaporator (m), a spray dryer (m), a nozzle centrifuge (m), a vacuum filter (p), a ring dryer (m), and an oil separator (r), whereby an m in brackets behind an apparatus means an apparatus mutual for potato and rape processing, a p in brackets behind an apparatus means an apparatus exclusively for potato processing, and an r in brackets behind an apparatus means an apparatus exclusively for rape processing. This embodiment of the potato processing plant according to the invention secures a possibility for an efficient processing of potatoes, and also an efficient processing of rape outside the potato season. In certain cases it is possible instead of the two decanters (decanter (m) and decanter (p)) and the two enzyme reactors (enzyme reactor (m) and enzyme reactor (p)) to use just one decanter and one enzyme reactor, by means of special flow systems; such methods are deemed to be encompassed by the invention, too.

Furthermore, the invention comprises a use of the potato processing plant according to the invention, which is characterized by the fact that the potato processing plant comprises an oil separator, heating equipment, and at least one enzyme reactor, and that the potato processing plant is used for processing of rape outside the potato season.

A preferred embodiment of the use according to the invention is characterized by the fact that the potato processing plant comprises a washer (p), a disintegrator (m), a decanter (m), a centrifugal sieve (m), a cooker (m), an enzyme reactor (m), a decanter (p), a jet cooker (p), an enzyme reactor (p), an evaporator (m), a spray dryer (m), a nozzle centrifuge (m), a vacuum filter (p), a ring dryer (m), and an oil separator (r), whereby an m in brackets behind an apparatus means an apparatus mutual for potato and rape processing, a p in brackets behind an apparatus means an apparatus exclusively for potato processing, and an r in brackets behind an apparatus means an apparatus exclusively for rape processing. This embodiment of the use according to the invention secures a possibility for an efficient processing of potatoes, and also an efficient processing of rape outside the potato season. In certain cases it is possible instead of the two decanters (decanter (m) and decanter (p)) and the two enzyme reactors (enzyme reactor (m) and enzyme reactor (p)) to use just one decanter and one enzyme reactor, by means of special flow systems; such methods are deemed to be encompassed by the invention, too.

It is to be understood that minor modifications of the method according to the invention, the potato processing plant according to the invention, and the use according to the invention are considered as falling inside the scope of the invention.

A typical example of such minor modifications is the supplementary treatment of the potato starch in order to produce a modified starch, e.g. starch which is enzymatically treated for production of maltodextrin, dextrin, cyclodextrin, or glucose, or starch which is oxidized for use in the paper industry. Even if the above indicated kinds of modified starch can be produced independently of this invention, it has been found that they can be produced at an extraodinarily low expense by means of the invention, because the production of these kinds of starch can be performed by using such pieces of equipment, which would otherwise not be used for any useful purpose, i.e. all pieces of equipment in the plant are used optimally.

More detailed examples of such minor modifications are the following.

1. The pulp is not decomposed as usual by jet cooking and enzyme treatment, but dried in the ring drier. After enzyme treatment the fruit water is not dried, but sold as a fluid concentrate. The starch which exits from the nozzle centrifuge, is decomposed to maltodextrin (e.g. DE=10%), evaporated in the evaporator and spray dried in the spray drier.

2. The pulp is decomposed as usual, and subsequently the particle free phase is mixed with enzyme treated fruit water and spray dried. The fibres are dried in the ring drier. The starch which exits from the nozzle centrifuge is decomposed to glucose by amylase treatment and sold as a fluid concentrate.

3. The pulp is decomposed as usual, but between the decanter and the cooker an ultrafiltration unit is inserted. The permeate from the ultrafiltration is transferred to the cooker, and the retentate is a solution of "soluble fibres" which can be used as a valuable fat replacer.

It is to be understood that a plant similar to the above indicated plant, but with one or more apparatuses which differ from the apparatuses indicated above, which apparatuses perform the same functions, are to be considered as being inside the scope of the invention.

Also, it can be noted that the enzymatic processing of rape is an old art. Rape oil, rape protein, rape fodder sirup and hull parts are the main products obtainable from the crude rape starting product.

Reference is made to FIG. 1, which shows an embodiment of the combined potato and rape processing plant. The apparatuses which are used for both processes, are shown with full fat lines, the apparatuses, which are used for the potato processing only, are shown with full thin lines, and the apparatuses, which are used for the rape processing only, are shown with dotted thin lines. The function of the different apparatuses appear from FIG. 1.

Figure 2:
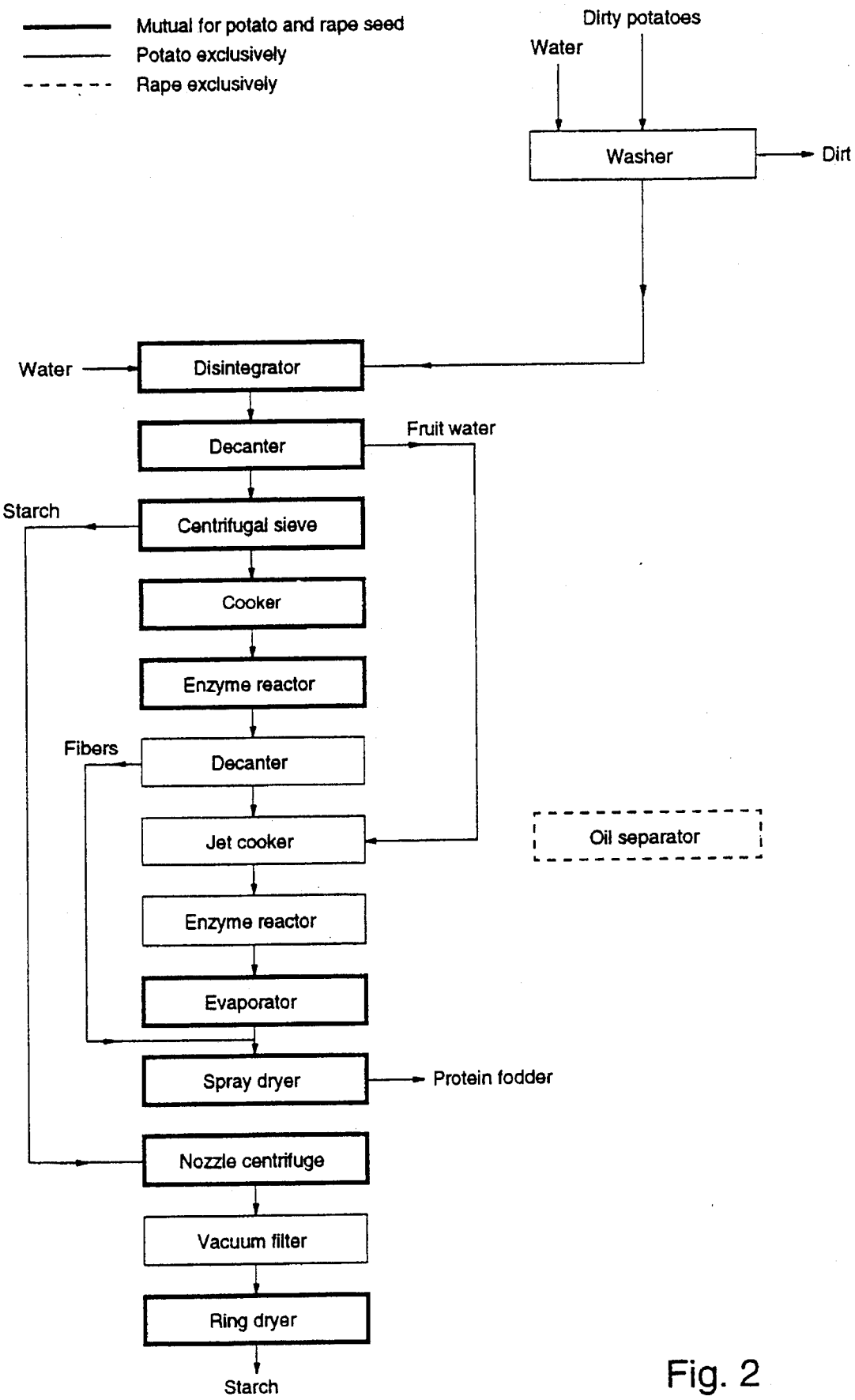
FIG. 2 shows the plant used as a potato processing plant. Thus, only apparatuses with full fat lines and full thin lines are used, and arrows (pipes) are added in order to generate a flow sheet.

Also, reference is made to FIG. 2, which is similar to FIG. 1, and which shows the plant used as a potato processing plant. Thus, only apparatuses with full fat lines and full thin lines are used in relation to FIG. 2, and arrows (pipes) are added in order to generate a flow sheet.

Figure 3:
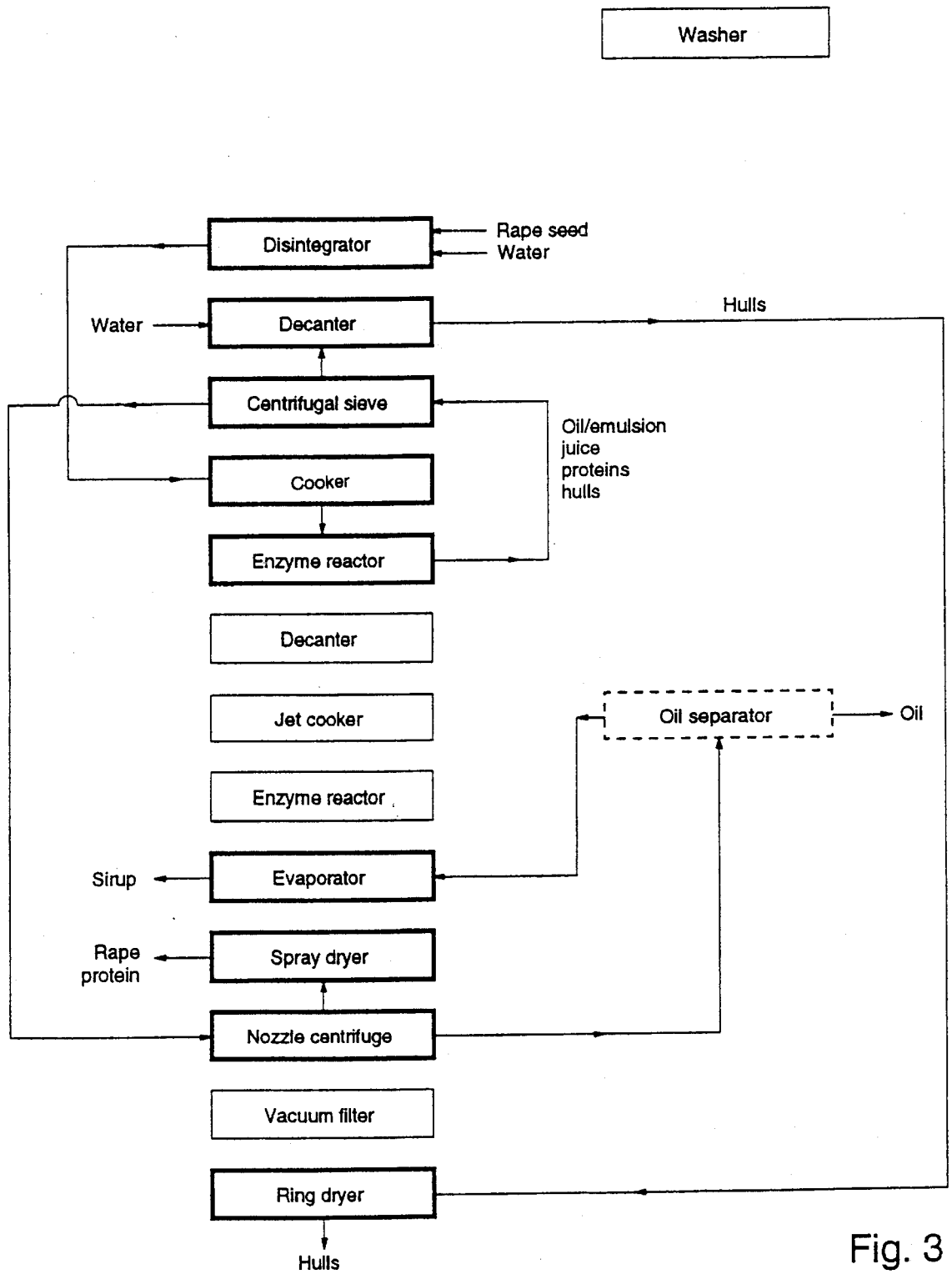
FIG. 3 shows the plant used as a rape processing plant. Thus, only apparatuses with full fat lines and dotted thin lines are used, and arrows (pipes) are added in order to generate a flow sheet.

Furthermore, reference is made to FIG. 3, which is similar to FIG. 1, and which shows the plant used as a rape processing plant. Thus, only apparatuses with full fat lines and dotted thin lines are used in relation to FIG. 3, and arrows (pipes) are added in order to generate a flow sheet.

Figure 4:
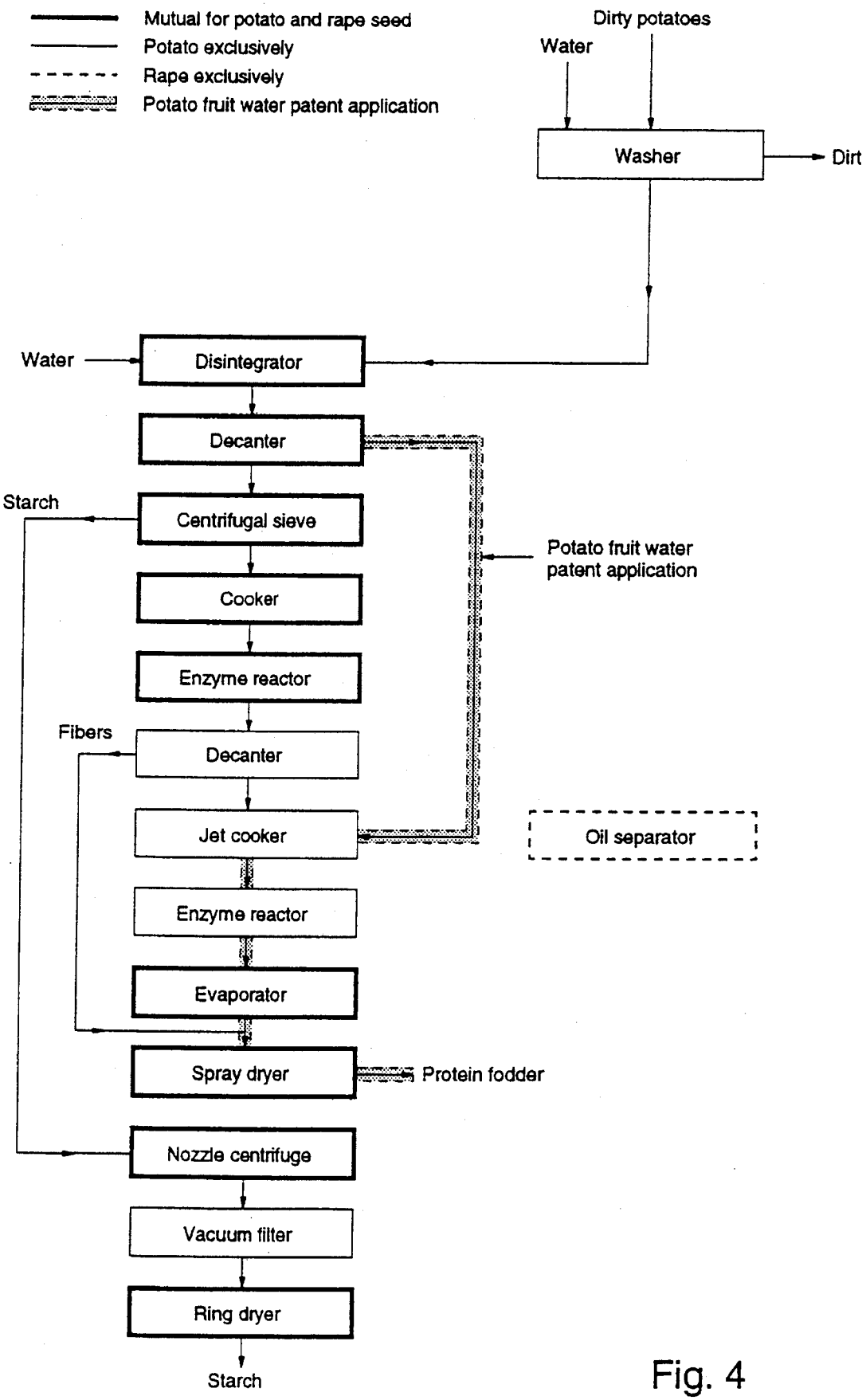
FIG. 4, in addition to containing all the information from FIG. 2 also contains information regarding the method for treatment of fruit water.
Figure 5:
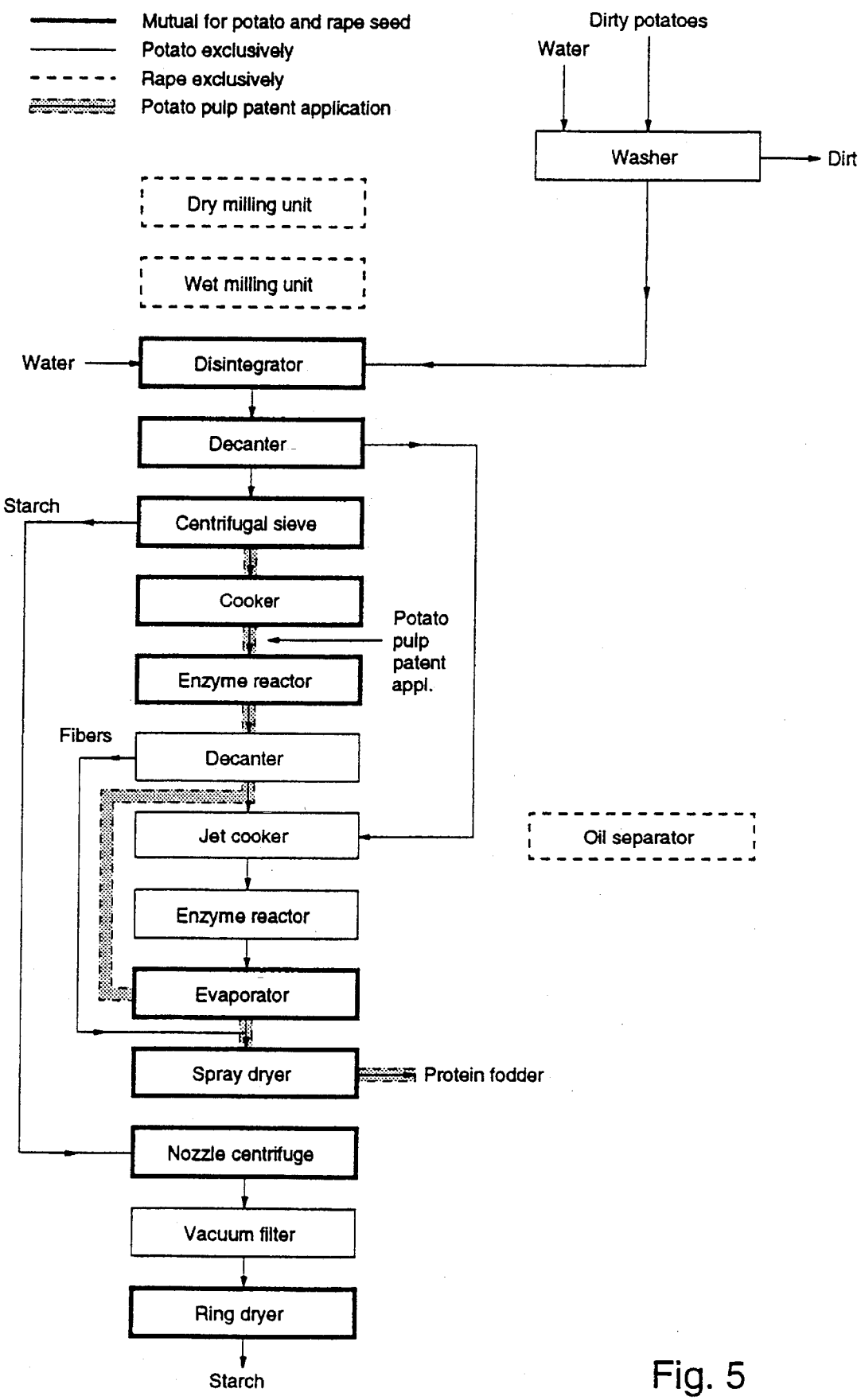
FIG. 5, in addition to containing all the information from FIG. 2 also contains information regarding the method for treatment of potato pulp.

Finally, reference is made to FIGS. 4 and 5, which contain all the information in FIG. 2, and from which it furthermore appears which special parts of the process are more detailed described in international patent application No. WO 93/15615, and international patent application No. WO 93/15616.

The following economical evaluation shows the advantage associated with the method, the plant and the use according to the invention.

A factory producing only starch from potatoes is not economically profitable. The present value is about 10 million DKK based on an investment of 200 million DKK. The return of investment for the whole period of depreciation (20 years) is negative.

A factory producing only oil, protein, syrup for fodder and hulls will be economically uncertain. The present value is calculated to 167 million DDK based on an investment of 175 million DDK. The return of investment over a period of 20 years will be 5–7%.

A combined factory, according to the invention will be most attractive. The present value is calculated to 391 million DDK based on an investment of 245 million DDK. This will result in a return of investment of 6–22% based on a 20 years period of depreciation.

For the economical balance the following assumptions have been made:

Depreciation of buildings: 20 years
Depreciation of machines: 10 years
Bank rate of interest for loan: 11% p.a.
Bank loan of the total investment 70%
Invested net capital 30%
Expenses for the loan is calculated as annuity.
The calculations are in fixed 1991 prices.
The yearly productions are shown in Table 1.
The estimated sales prices of the products are shown in Table 2.
The calculated investments in new plants are the following:
A potato factory: 200 million DKK
A rape seed oil factory: 175 million DKK
A combined factory: 245 million DKK The production time of the potato factory is around ⅓ of a year due to the normal practice. The production time of the rape seed oil factory is one full year. As earlier indicated, the combined factory typically should work ⅔ of a year on rape seed and ⅓ of a year on potatoes.

TABLE 1

Yearly productions

| | Potato factory tons/year | Rape seed factory tons/year | Combined factory tons/year |
| --- | --- | --- | --- |
| Potato starch | 28300 | 0 | 28300 |
| Potato-protein fodder | 10755 | 0 | 10755 |
| Rape seed oil | 0 | 35000 | 35000 |
| Rape seed protein meal | 0 | 32400 | 32400 |
| Rape seed hulls | 0 | 16300 | 16300 |
| Rape seed fodder syrup | 0 | 28300 | 28300 |

TABLE 2

Estimated sales prices

| | Estimated sales prices DKK/1000 kg |
| --- | --- |
| Potato starch | 3000 |
| Potato-protein fodder | 2500 |
| Rape seed oil | 2800 |
| Rape seed protein meal | 4133 |

TABLE 2-continued

Estimated sales prices

| | Estimated sales prices DKK/1000 kg |
| --- | --- |
| Rape seed hulls | 500 |
| Rape seed fodder syrup | 850 |

The prices for raw materials

The price of potatoes is approximately 375 DKK per 1000 kg based on information from KMC (Kartoffelmelscentralen).

The price of rape seed is 1530 DKK per 1000 kg. This price is without subsidy given from EEC.

In Table 3 a yearly economical calculation is shown.

TABLE 3

Yearly economical calculations

| | Potato factory million DKK | Rape seed oil factory million DKK | Combined factory million DKK |
| --- | --- | --- | --- |
| Sales (Income) | 116.8 | 264.1 | 380.9 |
| Expenses: | | | |
| Raw material | 56.3 | 153.0 | 209.3 |
| Energy | 11.0 | 26.0 | 36.0 |
| Enzymes | 16.3 | 32.5 | 48.8 |
| Chemicals | 1.0 | 7.0 | 7.0 |
| Capacity costs (salaries) | 4.0 | 7.0 | 7.0 |
| Maintenance | 5.0 | 3.0 | 8.0 |
| Marketing costs | 2.0 | 2.0 | 3.0 |
| Depreciation | 13.0 | 11.4 | 15.9 |
| Interests | 10.5 | 9.2 | 13.0 |
| Profit (before tax) | −2.2 | 13.0 | 32.9 |

The reason why it is now found to be an advantage to combine the production is that the new lay-out of the potato factory is taken care of from the very beginning during the full design of the new factory. Many projects have been made for better utilization of potato factories outside the potato season. But in old plants most of the unit operations are not usable for multi-application as those in the present invention, where they have been selected right from the beginning.

We claim:

1. A method for processing potatoes to obtain potato starch and potato fodder protein comprising processing said potatoes in a potato processing plant to produce potato starch and potato fodder protein wherein said potato processing plant comprises heating equipment to heat said potatoes and in which said heating equipment can also be used for processing rape, at least one enzyme reactor to enzymatically treat said heated potatoes and in which said enzyme reactor can also be used for processing rape, and an oil separator for processing rape.

2. The method according to claim 1 in which said heating equipment comprises a cooker.

3. The method according to claim 2 in which the heating equipment comprises one cooker used exclusively for potato processing and one cooker used exclusively for processing rape.

4. The method according to claim 1 in which the potato processing plant comprises two enzyme reactors, in which one enzyme reactor is used for processing potatoes and one enzyme reactor is used for processing rape.

5. The method according to claim 1 in which the potato processing plant further comprises before the heating equipment a washer to wash said potatoes, in which said washer is used exclusively for potato processing, a disintegrator to disintegrate said washed potatoes, a decanter to remove potato fruit water from said disintegrated potatoes, and a centrifugal salve to remove potato starch from said decanted potatoes.

6. The method according to claim 5 in which the potato processing plant further comprises a centrifuge to separate the potato starch from contaminants; filtering the potato starch from the centrifugation with a vacuum filter in which said vacuum filter is used exclusively for potato processing, and a ring dryer to dry said potato starch.

7. The method according to claim 1 in which the potato processing plant further comprises an evaporator to evaporate the enzymatically treated potatoes and a spray dryer to dry the evaporated potatoes.

8. A method for processing rape seeds to obtain rape protein, hulls, and rape oil comprising processing rape seeds in a potato processing plant to produce rape protein, hulls, and rape oil, wherein said potato processing plant comprises heating equipment to heat said rape seeds and in which said heating equipment can also be used for processing potatoes, at least one enzyme reactor to enzymatically treat said heated rape and in which said enzyme reactor can also be used for processing potatoes, and an oil separator for separating rape oil from said seeds.

* * * * *